Patented Aug. 3, 1943

2,326,078

UNITED STATES PATENT OFFICE 2,326,078

PROCESS OF POLYMERIZING METHACRYLIC ACID

Ernst Trommsdorff and Gerhard Abel, Darmstadt, Germany, assignors to Röhm & Haas Company, Philadelphia, Pa.

No Drawing. Application May 8, 1940, Serial No. 333,940. In Germany December 7, 1938

10 Claims. (Cl. 260—83)

This invention relates to a method for preparing polymethacrylic acid in granular form which is insoluble in water but which swells therein and dissolves readily in aqueous alkali or ammonium hydroxide solution to form the polymeric salts. It also relates to a process for preparing copolymers which are also soluble in the alkaline solutions and which contain methacrylic acid as one of their constituents.

Aqueous solutions of salts of polymeric carboxylic acids can be used as dispersing, emulsifying, thickening, sizing, and binding agents. Up to the present, however, practically the only polymeric acid which has been used for this purpose is polyacrylic acid. The water-soluble salts of polyacrylic acid suitable for the above purposes may be readily obtained by saponifying polyacrylonitrile or polyacrylic acid esters. They have not been made by direct polymerization of the salts of acrylic acid because it is very difficult to completely polymerize these salts and only polymers of low degree of polymerization can be obtained by this method. The polymers of high viscosity are more efficient and have a wider field of application.

On account of the advantages which polymethacrylic compounds have over the polyacrylic compounds for many purposes it was natural to consider the use of water-soluble salts of polymethacrylic acid for the same uses. However, this was not practical because according to all experience neither polymethacrylonitrile nor polymethacrylic acid esters can be saponified. Furthermore, the water-soluble salts of methacrylic acid behave in much the same manner on polymerization as do the acrylates, viz.: polymerization is incomplete and the degree of polymerization is low.

It is known that methacrylic acid may be polymerized in solution, for example in an organic solvent such as benzine or trichlorethylene. On account of the dilution, however, the rate of polymerization is slow and only polymers of relatively low molecular weight can be obtained which make the process unsuitable for the present purposes. If the methacrylic acid is polymerized in aqueous solution, long times are required, 24 to 48 hours, and the polymers obtained are sticky, gelatinous materials which are very difficult to handle. It is not possible practically to polymerize pure, undiluted methacrylic acid on account of the vigorous reaction and the difficulties of controlling it.

It is an object of the present invention to provide a method for preparing polymethacrylic acid in a granular form from which solutions of its water-soluble salts can be readily prepared. It is a further object to prepare granular copolymers of methacrylic acid and other polymerizable compounds which alone form polymers insoluble in water, the copolymer being capable of forming salts which are soluble in water.

These objects are accomplished by suspending monomeric methacrylic acid or a mixture thereof with another polymerizable material in an aqueous solution of an electrolyte, maintaining the suspension by mechanical means and heating it until the polymerization is complete. Any of the usual catalysts of polymerization can be added either to the liquid to be polymerized or to the aqueous solution.

The aqueous solutions of electrolyte which are suitable for dispersing the methacrylic acid contain at least 10% of a salt, particularly a neutral salt which does not form an insoluble compound with the acid. Preferably the solution contains from 15 to 30% of salt and the most suitable ones are those of the alkali metals and ammonium. Methacrylic acid is not very soluble in such solutions and, hence, by using more than enough methacrylic acid to saturate the solution of the electrolyte, a suspension of the excess acid can be made by mechanical agitation.

In order to obtain fine suspensions a small amount of a dispersing agent may be added to the electrolyte solution. Suitable dispersing agents are water-soluble colloids such as gelatine, tragacanth, water-soluble starches or salts of polymeric carboxylic acids. Inorganic colloids or powders such as talc, barium sulfate, etc. may also be employed for this purpose. When the water-soluble salts of polymeric carboxylic acids are used as dispersing agents, these may be formed in situ by adding the monomeric salt to the electrolyte solution. During the process this salt will polymerize sufficiently to form the dispersing agent. The dispersing agent decreases the size of the granules and, hence, the size may be regulated by the type and amount of dispersing agent employed. When insoluble dispersing agents are employed, they may be easily removed from the granular polymer by washing.

The process may be carried out by adding all of the methacrylic acid to the salt solution in one charge or it may be added in portions or continuously during the polymerization. In the first case it is preferable to employ a catalyst which is soluble in the monomer, for example benzoyl peroxide, whereas in the second it is better to add a water-soluble catalyst, such as potassium persulfate, to the salt solution. The polymerization is usually carried out at about 70–95° C. and requires only two or three hours for completion.

The polymeric methacrylic acid is purified by washing with a solution of an electrolyte, best with one which on drying leaves no residue, for example a 5 to 10% solution of hydrochloric acid. The polymethacrylic acid is obtained in practically theoretical yields and, in spite of the use of large amounts of salt in the solution, it is practically ash-free.

In case pure monomeric methacrylic acid is not available, the dispersion in the electrolyte may be prepared directly from a saponifiable derivative such as an ester or the amide. This may be done by saponifying the monomeric derivative with caustic and, when this is complete, neutralizing with the equivalent amount of an acid. Additional amounts of a salt and water are then added and the free acid is dispersed in the solution. When there is an excess of acid or when a mineral acid is used as the electrolyte, polymers of low degree of polymerization are obtained. Small amounts of alcohol or other organic materials, for example the alcohol from the saponification of the monomeric ester, have no effect on the polymerization.

Copolymers of methacrylic acid and other polymerizable materials may be made in the same way. Examples of other polymerizable substances are the esters and the nitriles of acrylic and methacrylic acids, styrene, vinyl chloride, etc. In preparing such copolymers the proportion of methacrylic acid in the mixture of monomers can be varied considerably. However, there must always be enough methacrylic acid in the mixture to yield a polymer which is soluble in alkali metal or ammonium hydroxide to yield the desired polymeric salt. In the case of a copolymer of methacrylic acid and methyl methacrylate, for example, a 40:60 mixture represents about the smallest amount of the acid which can be employed to yield a copolymer soluble in aqueous solutions of sodium or potassium hydroxide.

The polymeric methacrylic acid and the copolymers are all insoluble in water but readily soluble in alkalis or ammonia. The polymeric acid and the copolymers containing at least 80% of acid all swell in water whereas those copolymers which contain less than about 80% of the acid do not swell. In the preparation of the latter, it is therefore unnecessary to use a solution of an electrolyte in washing them as is the case with those polymers which swell in water in order to free them of the last traces of the electrolyte present in the solution during polymerization.

The copolymers form more viscous solutions at the same concentration than does the polymer of the pure methacrylic acid and for many purposes it is more advantageous to employ them. The viscosity of the solutions of the salts of the copolymers can be varied over a considerable range by changing the proportion of methacrylic acid and the other polymerizable material. The following table shows how this viscosity varies when different mixtures of methacrylic acid and methyl methacrylate are polymerized and converted to their alkali metal salts. The viscosity is that of a 10% solution of the sodium salt expressed as the number of seconds required for a steel ball 2.5 mm. in diameter to fall through a 20 cm. column of the solution at 20° C.

*Composition of copolymer*

| Methacrylic acid | Methylmethacrylate | Viscosity |
|---|---|---|
| Per cent | Per cent | Seconds |
| 80 | 20 | 11 |
| 70 | 30 | 12 |
| 60 | 40 | 15 |
| 55 | 45 | 18 |
| 50 | 50 | 40 |
| 45 | 55 | 130 |

The viscosity of the aqueous solutions of the polymeric salts can also be varied by changing the conditions of polymerization, such as the amount of catalyst or the temperature. This applies to the pure methacrylic acid polymer as well as to copolymers containing it.

In preparing the aqueous solutions of the salts of polymethacrylic acid and copolymers containing it, it is best to first swell the polymeric acid, and those copolymers which are subject to swelling, in water and then add a solution of alkali to form the salt. Those copolymers which do not swell in water can be dissolved directly in the alkali. The copolymers dissolve more readily than the pure polymeric acid because of a diminished tendency to form lumps. The solutions obtained are all clear and colorless, whereas solutions of salts of polyacrylic acid obtained by saponification of polyacrylonitrile always have a yellow cast.

In carrying out the process it is not necessary to isolate and purify the methacrylic acid prior to polymerization. The aqueous solution obtained by saponifying a monomeric compound may be used directly both for obtaining the pure polymethacrylic acid or any of the copolymers containing it.

The solutions of the polymethacrylates and the copolymers may be used for creaming latex, in the preparation of cosmetics and toothpastes, and as "sets" in permanent waving. The soluble copolymers are particularly suitable for cosmetic purposes because they can be easily produced entirely free of odor.

The following examples will illustrate the invention which, however, is not limited to the exact proportions and ingredients shown as it may be otherwise practised within the scope of the appended claims. The parts are by weight.

*Example 1*

80 parts of anhydrous sodium sulfate is dissolved in 500 parts of a 20% aqueous solution of methacrylic acid and 8 parts of a 10% solution of sodium polyacrylate is added to this solution. 0.2 part of benzoyl peroxide is then stirred into the solution which is then heated for about 2½ hours at 80° C. while stirring constantly. The temperature is then raised to 90–95° C. for a short time. The solid polymethacrylic acid is then allowed to settle, washed free of sulfate with a 5% solution of hydrochloric acid and dried. The polymer is obtained in the form of a sandy mass from which highly viscous solutions of the amonium or alkali metal salts can be prepared.

*Example 2*

10 parts of a 10% solution of sodium polyacrylate and 0.25 part of potassium persulfate are added to 400 parts of a 22% sodium chloride solution. This solution is then heated to 75° C. and 100 parts of methacrylic acid is added at the rate at which polymerization progresses. After all the acid has been added, the temperature is raised to 95° C. and held there for a short time. The polymer is obtained in the form of flaky lumps and is washed and dried as described in Example 1.

The alkali metal salts may be easily prepared from the polymer.

*Example 3*

A copolymer of methacrylic acid and methyl methacrylate in the proportion of 90:10 is prepared as follows:

200 parts of methyl methacrylate is emulsified in 110 parts of water containing a small amount of sodium lauryl sulfate. 195.5 parts of a 45% sodium hydroxide solution is then added and the reaction mixture heated to 70° C. The methyl alcohol formed is distilled out and 1 part of sodium polyacrylate added to the residue which is then neutralized with sulfuric acid. 19.1 parts of methyl methacrylate containing 0.3 part of benzoyl peroxide is then added and the mixture heated to 75-78° C. while stirring until the polymerization is complete.

The polymeric methacrylic acid is obtained in the form of fine pearls which are washed free of sulfate with a 5% solution of hydrochloric acid. When dissolved in alkali, the polymer yields clear, highly viscous solutions.

*Example 4*

200 parts of methyl methacrylate is saponified in a solution of 88 parts of sodium hydroxide in 220 parts of water. 60 parts of a methanol-water mixture is distilled out and to the residue there is added 130 parts of water containing 2 parts of sodium polyacrylate. This solution is acidified with 226 parts of 45% sulfuric acid and then a mixture of 138 parts of methyl methacrylate and 34 parts of acrylonitrile containing 0.3% of benzoyl peroxide is emulsified in it.

The resulting mixture is stirred and heated to 70° C. Considerable heat is evolved during the polymerization and the mixture is held at 70-72° C. by suitable cooling. At the end of two hours the polymerization is complete and the acidic copolymer is obtained in the form of fine pearls which are filtered off, washed with water and dried. A 10% aqueous solution of the sodium salt of this copolymer has a viscosity of 75 sec. when measured by the falling ball method described above.

*Example 5*

A copolymer of 60 parts of methacrylic acid and 40 parts of methyl methacrylate is prepared as follows:

314.8 parts of methyl methacrylate is saponified in 300 parts of a 26.5% solution of sodium hydroxide. To the resulting solution there is added 30 parts of water containing one part of sodium polyacrylate and 0.3 part of sodium isopropylnaphthalene sulfonate. This solution is then acidified with 207 parts of 45% sulfuric acid and a suspension of 0.29 part of benzoyl peroxide in 10 parts of water is added. The resulting mixture is then stirred and heated to 74° C. The polymerization is complete in about two hours. The copolymer is obtained in granular form and is washed with water and dried. A 10% solution of the ammonium salt of this copolymer has a viscosity of 300 sec. by the falling ball method.

*Example 6*

The procedure shown in Example 5 is repeated except that the sodium polyacrylate is replaced by 25 parts of talc. The polymerization is somewhat slower and the polymer is obtained in the form of fine pearls mixed with the talc.

We claim:

1. The process of preparing, in granular form, water-insoluble polymeric material capable of dissolving to form clear solutions in dilute alkali, which comprises suspending polymerizable material containing at least 40% methacrylic acid in an aqueous solution containing at least 10% of a neutral salt of a mineral acid, the cation of which salt is capable of forming water-soluble methacrylate salts, and subjecting the suspension of polymerizing influences.

2. The process of preparing, in granular form, water-insoluble copolymers containing at least 40% of polymerizable methacrylic acid, which copolymers are capable of dissolving to clear solutions in dilute alkali, which comprises suspending polymerizable material containing at least 40% methacrylic acid in an aqueous solution containing at least 10% of a neutral salt of a mineral acid, the cation of which salt is capable of forming water-soluble methacrylate salts, and subjecting the suspension to polymerizing influences.

3. The process of preparing copolymers of methacrylic acid and vinyl chloride, which copolymers are capable of dissolving to clear solutions in dilute alkali, which comprises suspending methacrylic acid and at most 1.5 times as much vinyl chloride in an aqueous solution containing at least 10% of a neutral salt of a mineral acid, the cation of which salt is capable of forming water-soluble methacrylate salts, and subjecting the suspension to polymerizing influences.

4. The process of preparing copolymers of methacrylic acid and styrene, which copolymers are capable of dissolving to clear solutions in dilute alkali, which comprises suspending methacrylic acid and at most 1.5 times as much styrene in an aqueous solution containing at least 10% of a neutral salt of a mineral acid, the cation of which salt is capable of forming water-soluble methacrylic salts, and subjecting the suspension to polymerizing influences.

5. The process of preparing copolymers of methacrylic acid and methacrylic acid esters, which copolymers are capable of dissolving to clear solutions in dilute alkali, which comprises suspending methacrylic acid and at most 1.5 times as much methacrylic acid esters in an aqueous solution containing at least 10% of a neutral salt of a mineral acid, the cation of which salt is capable of forming water-soluble methacrylate salts, and subjecting the suspension to polymerizing influences.

6. The process of preparing, in granular form, water-insoluble polymeric material capable of dissolving to form clear solutions in dilute alkali, which comprises suspending polymerizable material containing at least 40% methacrylic acid in an aqueous solution containing at least 10% of a neutral salt of a mineral acid, the cation of which salt is capable of forming water-soluble methacrylate salts, and heating the suspension at a temperature between about 70° C. and about 95° C. to effect polymerization.

7. The process of preparing, in granular form, water-insoluble polymeric material capable of dissolving to form clear solutions in dilute alkali, which comprises suspending polymerizable material containing at least 40% methacrylic acid in an aqueous solution containing at least 10% of a neutral salt of a mineral acid, the cation of which salt is capable of forming water-soluble methacrylate salts, and heating at a temperature between about 70° C. and about 95° C. in the presence of a peroxide catalyst until polymerization is substantially complete.

8. The process of claim 1 in which the salt solution contains a small amount of a dispersing agent.

9. The process of preparing water-insoluble polymers, which polymers are capable of dissolving to clear solutions in dilute alkali, which comprises suspending polymerizable material containing at least 40% methacrylic acid in an aqueous solution containing at least 10% sodium sulfate, and subjecting the suspension to polymerizing influences.

10. The process of preparing water-insoluble polymers, which polymers are capable of dissolving to clear solutions in dilute alkali, which comprises suspending polymerizable material containing at least 40% methacrylic acid in an aqueous solution containing at least 10% sodium chloride, and subjecting the suspension to polymerizing influences.

ERNST TROMMSDORFF.
GERHARD ABEL.